United States Patent
Anderson

[15] 3,684,087
[45] Aug. 15, 1972

[54] PORTABLE GRILLING APPARATUS

[72] Inventor: Robert F. Anderson, 3613 13th St., Menominee, Mich. 49858

[22] Filed: July 23, 1970

[21] Appl. No.: 57,694

[52] U.S. Cl. ................. 206/47 R, 126/9 A, 126/25
[51] Int. Cl. ........ A47j 37/06, F24b 3/00, B65d 85/00
[58] Field of Search ............ 206/47 R, 46 R, 45.33; 126/9 A, 25; 220/44 A; 229/52 AL

[56] References Cited

UNITED STATES PATENTS

| 3,353,527 | 11/1967 | Anderson | 126/9 A |
| 3,279,453 | 10/1966 | Norehad et al. | 126/9 A |
| 2,252,297 | 8/1941 | MacIntyre | 206/DIG. 2 |
| 2,751,901 | 6/1956 | Livermore | 220/44 A |
| 3,509,814 | 5/1970 | Karapetian | 126/25 |
| 3,497,057 | 2/1970 | Traner et al. | 206/45.33 |
| 3,114,496 | 12/1963 | Wilcox | 229/52 AL |

Primary Examiner—William T. Dixson, Jr.
Attorney—C. Kenneth Bjork

[57] ABSTRACT

A portable grilling apparatus comprising a thin sheet grill element fitted to or otherwise held by a thin metal tray. The tray supports an array of readily ignitable fuel elements. A support member of height greater than the depth of the tray is fitted around the outside of the tray. This grilling apparatus is particularly adapted for a single use.

10 Claims, 7 Drawing Figures

PATENTED AUG 15 1972 3,684,087

INVENTOR.
Robert F. Anderson
BY
C. Kenneth Bjork
AGENT

PATENTED AUG 15 1972　　　　SHEET 2 OF 2　　　　3,684,087

INVENTOR.
Robert F. Anderson
BY C. Kenneth Björk
AGENT

PORTABLE GRILLING APPARATUS

BACKGROUND OF THE INVENTION

This invention relates to a portable grilling apparatus and more particularly is concerned with a portable grill apparatus especially adapted for a single usage and employing charcoal fuel.

Portable grills of various configurations and designs including self-contained portable grilling apparatus intended primarily for a single usage are known in the art. See, for example, U.S. Pat. No. 3,353,527 wherein there is taught a portable, disposable grilling apparatus having a paper-like box member as a base, a metal tray supported by the base and containing fuel elements disposed therein and a foraminous grill element or cooking surface supported on the edges of the metal tray.

It is a principal object of the present invention to provide a new and useful portable grilling apparatus.

It is another object of the present invention to provide a grilling unit having self-contained fuel elements.

It is a further object of the present invention to provide a packaged portable grilling assembly wherein plates, utensils, grill, fuel and the like members and equipment are all contained in a readily transportable package.

An additional object of the present invention is to provide a grill having self-contained fuel which is readily ignitable and which, upon ignition rapidly provides a useful heat source for grilling.

It is also an object of the present invention to provide a grilling apparatus having a grill element configuration which markedly reduces the amount of hot grease and other fluids dripping from meat or other food items being cooked thereon that falls into the hot fuel elements thereby substantially reducing obnoxious smoking and virtually eliminating the possibility of a hazardous fire from burning grease.

These and other objects and advantages of the present invention will readily become apparent from the detailed description presented hereinafter when read in conjunction with the accompanying drawings.

BRIEF DESCRIPTION OF THE INVENTION

Figure 1:
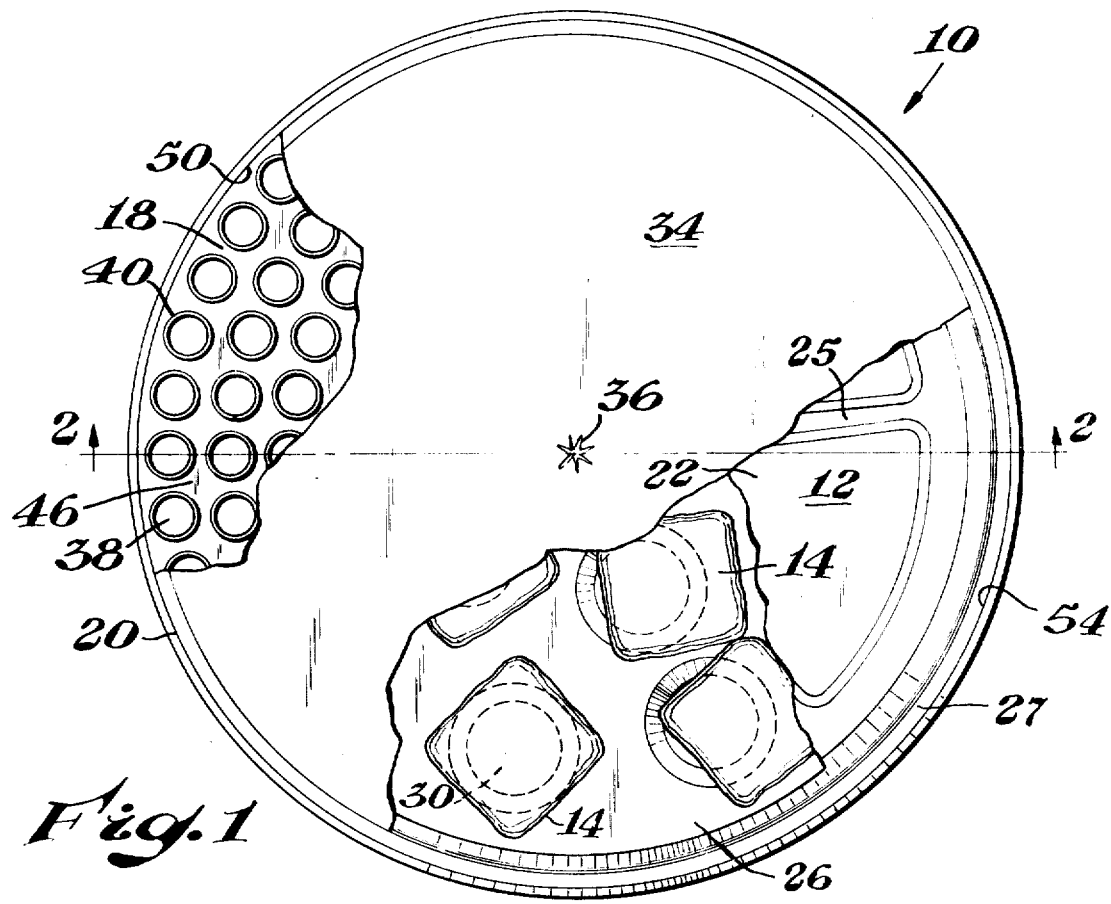
FIG. 1 is a top plan view, partly broken away and in section, of one embodiment of a grilling apparatus of the present invention.

In general the portable grilling apparatus of the present invention comprises a circular, elliptical or other geometrically shaped thin sheet grill element. The outer periphery of this element is fitted to, i.e. connected, fastened, and/or otherwise held by the upper edge of a metal tray. The metal tray supports an array of readily ignitable fuel elements. An igniter is positioned between the fuel elements and the bottom of the grill element. A support member of height greater than the depth of the tray is fitted around the outside of the tray. When packaged for shipment and/or storage prior to use, the grill assembly is held by a container having a handle for ready carrying. Additionally, the container usually is fitted with an assortment of picnic utensils.

DESCRIPTION OF THE PREFERRED EMBODIMENTS

A preferred embodiment of the grilling apparatus 10 as shown in the FIGURES of the drawing comprises a shallow tray 12, ordinarily pressed from a thin sheet of metal such as steel or aluminum. The tray 12, which tapers inwardly from top to bottom and resembles a pie pan in shape, ranges from about 8 to about 16 inches, ordinarily from about 9 to about 12 inches, in diameter as measured across its upper surface and is of a depth sufficient to hold an array of fuel elements 14 such that these do not contact the bottom surface 16 of a grill element 18 positioned and held to the upper edge 20 of the tray 12. Ordinarily, the tray 12 ranges in depth from about 0.75 to about 2 inches. The diameter of the apparatus 10 provides for ready portability and a practical size of grilling surface area.

Figure 6:
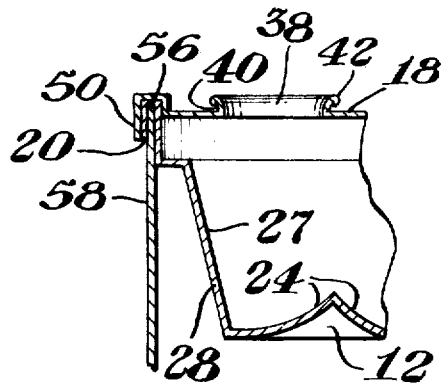
FIG. 6 shows in fragmentary sectional view, on an enlarged scale, an alternative configuration for the connection of grill element and fuel holding tray.

The bottom 22 of the tray 12 can be shaped to contain a plurality of spaced apart depressions 24, as shown in FIG. 6. Each of the depressions 24 is of a size to hold a particulate fuel element 14, e.g. a charcoal briquette of the type commonly employed for grilling operations.

Figure 2:
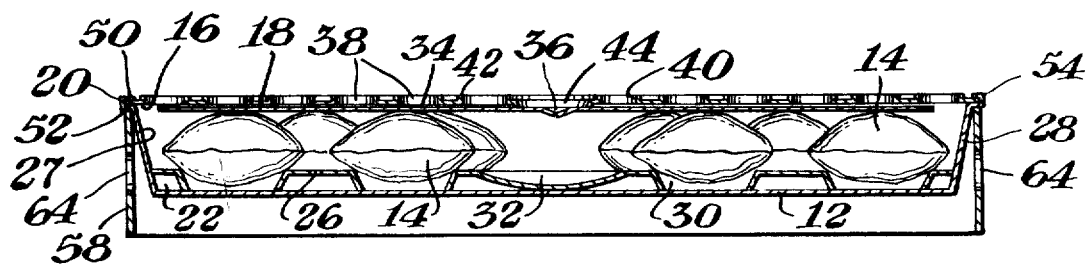
FIG. 2 is a vertical sectional view of the apparatus taken along line 2—2 of FIG. 1.
Figure 3:
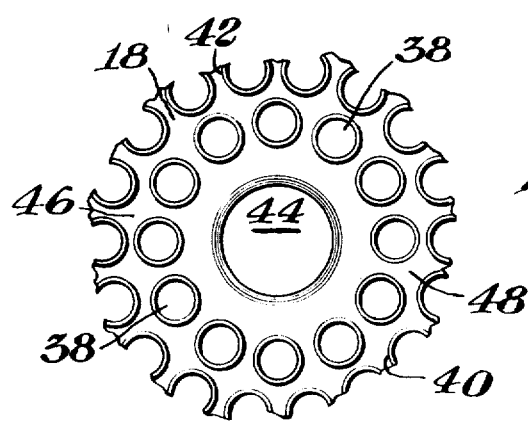
FIG. 3 is a fragmentary top plan view of the grill element of the grill apparatus of FIG. 1.
Figure 4:
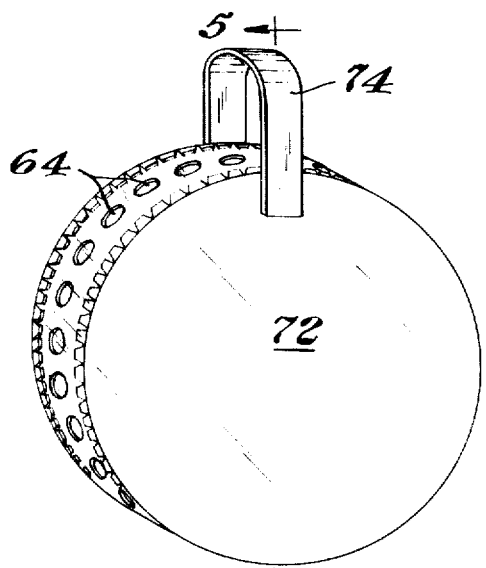
FIG. 4 is an isometric view of one embodiment of a package unit containing the grill assembly of FIG. 1.
Figure 5:
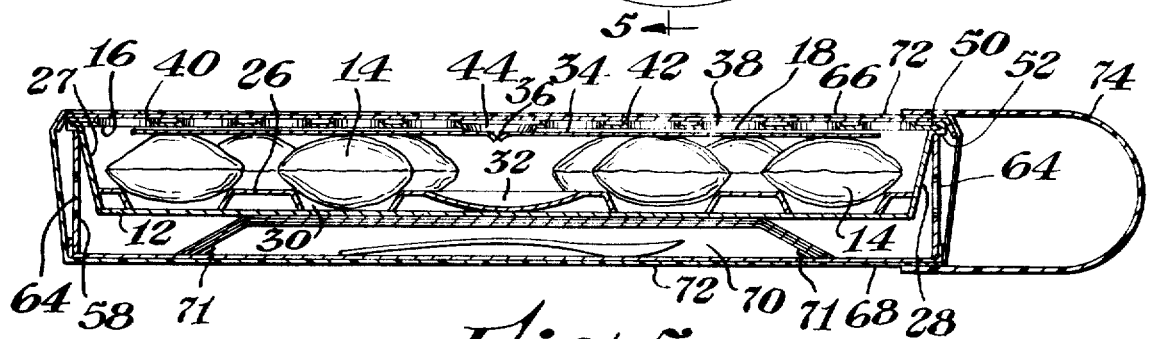
FIG. 5 is a vertical sectional view of the packaged unit of FIG. 4 taken along line 5—5.

Alternatively, the bottom 22 of the tray 12 can be flat or can contain integral thin, narrow depressions or raised ribs 25, for example, radially extending outward from the center as strength imparting and stiffening struts. When the tray 12 has a substantially flat bottom 22, a plate-like fuel element holder 26 can be employed to hold the fuel elements 14. This holder 26, as shown in FIGS. 1, 2 and 5 consists of a circular metal sheet member of a diameter such that it fits freely within tray 12 and has an outer periphery of a configuration such that it is substantially adjacent the inner surface 27 of sidewall 28 of tray 12. The fuel holder 26 contains a plurality of spaced-apart open-bottomed indentations or depressed pockets 30 each of a size to support one or more fuel elements 14, e.g. charcoal chips or compressed charcoal briquettes as commonly employed for grilling. Preferably, quick lighting charcoal briquettes are used as the fuel elements 14 and the depressions 30 are of a size to hold a single fuel element 14.

Preferably the holder 26 contains a central depression 32 to catch and hold grease drippings and other liquids collected by the grill element 18.

In still another embodiment, charcoal briquettes prepackaged in a spaced apart array and into a configuration which fits within tray 12 can be merely placed in the bottom 22 of the tray 12. Additionally, charcoal can be molded into an integral unit forming a spaced apart array of fuel elements 14 in the depressions 24 in the bottom 22 of a tray 12 or into the fuel holder 26 is such is used. In this embodiment, usually thin rays or strips of the fuel are left between the separated fuel elements 14 to aid in the progression of the ignition front throughout the entire array.

A thin combustible sheet 34, usually of paper or cardboard, is positioned on top of the array of fuel elements 14 in the tray 12. This serves as an igniter for the fuel elements 14. Conveniently, this igniter 34 is in the form of a circle of about the same size as the upper interior of tray 12. Alternatively, the igniter 34 can be in the design of a web, grid, radial strips or other configuration of a shape such that each fuel element 14 is touched by a portion of the igniter 34. The circular sheet igniter 34 shown in the FIGURES contains a scored small center depression 36 to facilitate ignition.

For operability it is essential that the igniter 34 be of a readily combustible, easily ignitable material, which when once ignited will continue to burn until completely consumed. However, the igniter 34 also must impart enough heat energy to the fuel elements 14 such that these reach their kindling point. Oil or wax impregnated or coated paper or cardboard are effective materials for use in fabricating the igniter 34.

In one embodiment of the present grilling apparatus 10 using a commercially available readily ignitable charcoal, the charcoal briquettes as fabricated are positioned in a spaced apart array in a carton. Ignition of the carton serves to initiate combustion of the briquettes. With such fuel elements 14, the carton itself can serve as the igniter. It is to be understood, however, that the circular sheet-like igniter 34 can be used in conjunction with the prepackaged fuel elements 14 if desired to facilitate rapid ignition of the carton and briquettes 14 contained therein.

To provide an excess of air for combustion of the fuel elements 14, the side wall 28 and/or bottom 22 of tray 12 can be fitted with a plurality of small ports if desired. These are not critical to the operation of the grill assembly 10.

The grilling element 18 usually is of a circular thin sheet metal, ordinarily steel, iron or aluminum, of from about 0.008 to about 0.015 inch or greater thickness. Conveniently, the grilling element 18 contains a plurality of spaced apart openings 38, punched, stamped or otherwise formed therein, the edges 40 of which are raised on one side so as to project outwardly a short distance, e.g. from about one thirty-second to about three thirty-seconds inch, above the plane of the grilling element 18. Ordinarily these openings 38 are from about 0.25 to about 2 inches, usually from about 0.5 to about 1 inch, in diameter. The actual size of these openings 38 is not critical except that they should be large enough to permit heat and "hickory odor" from the burning charcoal briquettes 14 to contact the food items being grilled but small enough so that the food items do not fall into the fuel elements 14.

In the assembled grill assembly 10, the grill element 18 is positioned such that the projections 40 extend upward. As shown, the projections 40 are curled over at their outer edge 42. This curling of the projections 40 is not essential but serves to remove the hazard of injury from contacting a sharp surface as well as provides a smooth round shoulder to reduce sticking of food items thereon thereby making it easier to handle and turn food items being cooked.

The grill element 18 also contains a port 44, usually a circular opening of from about 0.5 to about 2 inches in diameter, centrally located therein and vertically aligned so as to be substantially directly above depression 32 in the fuel holder 26. Alternatively, the opening 44 can be replaced by a depressed cup member. In this latter design it is not essential that the fuel holder 26 contain central depression 32 as the liquid byproducts from the grilling are caught by the cup in the grill element 18 itself.

The resulting configuration of the grill elements 18 provides a series of interconnected channels 46 between the raised projections 40 defining the openings 38 in the top surface 48 of grill element 18. These channels 46 serve to direct grease and other liquids toward the center well 44, or depressed cup if such design is used, thereby substantially reducing the amount of such materials from that which normally would strike the burning fuel elements 14.

The circular grill element 18 is of a diameter such that the outer edge 50 rests on a shoulder 52 formed in the upper edge 20 of the side wall 28 of tray 12. In the embodiment depicted in FIGS. 1, 2 and 5, the edge 54 of shoulder 52 of tray 12 is bent or crimped back over the outer periphery of grill element 18 thereby securely holding the grill element 18 in a fixed position.

Alternatively, as shown in FIG. 6, the upper edge 20 of tray 12 can be bent so as to rest on the top 56 of a support member 58. The outer edge 50 of grill element 18 resting thereon is bent downwardly to define a restraining flange.

Figure 7:
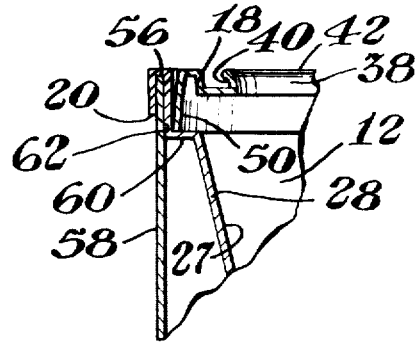
FIG. 7 is a fragmentary sectional view, on an enlarged scale, of another alternative configuration for connecting the edge of the grill element and fuel holding container.

In another embodiment, as shown in the sectional view of FIG. 7, the tray 12 can have its outer edge 20 bent down and crimped over the upper edge 56 of support member 58. In this embodiment, the side wall 28 of tray 12 further defines a shoulder 60 adjacent the inner upper side wall 62 of the support 58. Grill element 18 has its outer periphery bent downwardly, such that its edge 50 rests on shoulder 60.

The assemblies shown in FIGS. 6 and 7 are usually employed in those units intended for reuse by replenishing the array of fuel elements 14 since these embodiments provide ready access to the inside of tray 12 and/or fuel holder 26, if such is used.

Other means for securing the grill element 18 to tray 12 can be employed as readily is understood by one skilled in the art. Also, other foraminous configurations can be employed to define the grilling surface of the grill element 18. To illustrate, parallel, cross-hatched or other configurations of wires or rods in a spaced apart design can be used. Expanded grids stamped from a single sheet of metal also can be used. Likewise the perforations 38 employed in the depicted preferred embodiment can be of other geometric shape, e.g. elliptical or polygonal. The grill element can be solid if desired.

The tray 12 as shown in the depicted embodiment of FIGS. 1, 2 and 5 rests on a thin support sleeve or collar 58 of the same geometric configuration as the outer upper edge of tray 12. This support member 58 is of a size such that shoulder 52 of the tray 12 rests thereon.

Alternatively, as set forth hereinbefore and depicted in FIGS. 6 and 7, the edge 20 of tray 12 is crimped thereto over the top edge 56 of the support 58.

The support 58 is of a height greater than the depth of tray 12 so as to maintain a clearance between the hot bottom of the tray during operation and the ground or other surface below it. Usually this support 58 has a height of from about 0.25 to about 1 inch or more greater than the depth of the tray 12 and conveniently it is about twice the depth of the tray 12.

The tray support 58 can be formed of a paper-like material, for example thin cardboard, or polymers or other materials which have a vertical stiffness and strength sufficient to support the grill apparatus 10. Ordinarily a plurality of spaced-apart perforations 64 are placed around support 58 to aid in heat dissipation from the tray 12 during operation. The preferred pie pan shape tray 12 assures that the only contact of support 58 and tray 12 is at the upper edge 20 of the tray 12 as the inwardly tapered sidewall 28 of tray 12 angles away from the support 58.

When prepackaged for shipment and/or storage prior to use, the grill apparatus 10 usually is fitted with a disposable cardboard or plastic top member 66 and bottom member 68. The bottom 68 usually, as shown, is cut out to hold plates, eating utensils, spatula, tongs or the like articles to provide a complete "cook-out" package. In one preferred configuration, the bottom and/or top members 66 and 68 can each be at least one picnic plate. Conveniently, the utensils are contained in a separate package 70 and these fastened into the cutout portion of the bottom 68 and held in place by a band, tabs 71, e.g. or other fastening means. The entire assembly can be covered with a transparent cover 72, such as for example a shrink film outer coating. A handle 74 conveniently is attached to one side of the package. Other packaging means, e.g. a preformed transparent plastic enclosure to provide a dust-proof container can be used to cover the grill assembly 10. Alternatively, the grill assembly 10 can be placed into a box-like cardboard container and a separate prepackaged assortment of picnic utensils can be placed therein either adjacent the assembly 10 or separated therefrom by an internal separator.

In the depicted packaged assembly, the top cover member 66 can be both decorative and functional in design. This can be used to attract the purchaser's eye as well as set forth operating instructions. Additionally, ignition instructions can be printed directly on the igniter sheet 34.

To operate, the grill assembly 10 is removed from its prepackage, the tray 12 positioned onto support 58, and the igniter 34 contacted with a flame to initiate combustion of the fuel elements 14.

I claim:

1. A portable grilling apparatus comprising
   a. a substantially circular support the support collar having a vertical stiffness and strength to support the grilling apparatus,
   b. a shallow metal tray, the outer upper edge of said tray being of the same geometric configuration as said collar, the side wall of said tray tapering inwardly from top to bottom, a shoulder formed in the upper edge of the side wall of said tray, a center depression in the bottom of said tray, said tray being of a depth sufficient to hold an array of fuel elements such that these do not contact the bottom surface of a grill element positioned on and held by the shoulder of said tray, the shoulder of said tray resting on said support collar, the height of said support collar being greater than the depth of said tray so as to maintain a clearance between the bottom of said tray and surface below the bottom of said tray,
   c. an array of readily ignitable fuel elements positioned and held in said tray,
   d. a thin combustible sheet igniter for said fuel elements, said igniter positioned on top of the array of fuel elements in said tray, said igniter being in the form of a circle of about the same size as the upper interior sidewall of said tray,
   e. a circular thin sheet metal grilling element of a diameter such that the outer edge of said element is held by the shoulder of said tray, said grilling element containing a plurality of spaced apart openings formed therein the edges of which project outwardly above the top plane of said grilling element, said grilling element having a circular port at its center, said port being located substantially directly above the depression in the bottom of said tray, the portion of the grilling element between the raised projections at the edges of said openings providing a series of interconnected channels in the top surface of said grilling element, said channels during operation of said grilling apparatus directing liquids to said center port.

2. The portable grilling apparatus as defined in claim 1 wherein the array of fuel elements is a spaced apart array of charcoal briquettes.

3. The grilling apparatus as defined in claim 1 and packaged in a container, said container comprising a top member, a bottom member and a transparent covering encasing both of said top and bottom members, a handle fastened to one edge of said container, and having in combination therewith a prepackaged assortment of picnic utensils held by the bottom member of said container.

4. The portable grilling apparatus as defined in claim 1 wherein the bottom of said tray has a spaced apart array of pockets and the fuel elements are held in spaced apart array in said pockets.

5. The portable grilling apparatus as defined in claim 1 wherein the fuel elements are positioned in spaced apart depressions in a thin metal sheet-like fuel holder member placed in said tray, said fuel holder member being of a size such that it fits freely within said tray.

6. The grilling apparatus as defined in claim 5 wherein said fuel holder contains a center depression, said depression being substantially vertically aligned below said opening in said grill element.

7. The grilling apparatus as defined in claim 1 wherein said support collar is of a paper-like material.

8. The grilling apparatus as defined in claim 1 wherein said support collar contains a plurality of spaced-apart perforations.

9. The grilling apparatus as defined in claim 1 wherein the fuel elements are an integral unit of a molded spaced apart array of fuel elements.

10. The packaged assembly as defined in claim 3 wherein said bottom member is at least one picnic plate.

* * * * *

PO-1050
(5/69)

UNITED STATES PATENT OFFICE
CERTIFICATE OF CORRECTION

Patent No. 3,684,087          Dated August 15, 1972

Inventor(s) Robert F. Anderson

It is certified that error appears in the above-identified patent and that said Letters Patent are hereby corrected as shown below:

Claim 1, line 2 after "circular" insert ---thin-walled--- and after "support" first occurrence delete "the support"

Signed and sealed this 26th day of December 1972.

(SEAL)
Attest:

EDWARD M. FLETCHER, JR.
Attesting Officer

ROBERT GOTTSCHALK
Commissioner of Patents